(12) United States Patent
Mia et al.

(10) Patent No.: US 11,277,359 B2
(45) Date of Patent: Mar. 15, 2022

(54) INTEGRATION OF A MESSAGING PLATFORM WITH A REMOTE NETWORK MANAGEMENT APPLICATION

(71) Applicant: ServiceNow, Inc., Santa Clara, CA (US)

(72) Inventors: Md Shahrukh Mia, Kolkata (IN); Chetan Sindhwani, Pune (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/898,758

(22) Filed: Jun. 11, 2020

(65) Prior Publication Data

US 2021/0392093 A1 Dec. 16, 2021

(51) Int. Cl.
*H04L 12/58* (2006.01)
*G06F 16/955* (2019.01)
(Continued)

(52) U.S. Cl.
CPC ............ *H04L 51/02* (2013.01); *G06F 16/955* (2019.01); *G06F 21/31* (2013.01)

(58) Field of Classification Search
CPC ......... H04L 51/02; H04L 51/36; H04L 12/58; G06F 21/31; G06F 16/955; G06F 16/9033; G06F 16/9038; H04M 3/568
(Continued)

(56) References Cited

U.S. PATENT DOCUMENTS 4,941,084 A 7/1990 Terada et al.
5,185,860 A 2/1993 Wu
(Continued)

FOREIGN PATENT DOCUMENTS

EP 0433979 6/1991
EP 1607824 12/2005
(Continued)

OTHER PUBLICATIONS

ServiceNow for Slack, https://slack.com/help/articles/360001933108-ServiceNow-for-Slack#now-virtual-agent (last accessed May 11, 2020).
(Continued)

*Primary Examiner* — James N Fiorillo
(74) *Attorney, Agent, or Firm* — McDonnell Boehnen Hulbert & Berghoff LLP

(57) ABSTRACT

An embodiment may involve persistent storage containing a predefined token and application state. The embodiment may also involve an application configured to communicate with a message bot and perform operations including: (i) receiving, by way of an interface associated with a unit of program code and from the message bot, a command, wherein the command identifies a bot token and a user of a chat session in which the message bot is engaged; (ii) verifying, by the unit of program code, that the bot token matches the predefined token; (iii) verifying, by the unit of program code, that the user is authorized to use the command; (iv) writing, to the persistent storage, an update to the application state, wherein the update is based on the command; and (v) transmitting, by way the interface and to the message bot, a response confirming that the command has been performed.

20 Claims, 15 Drawing Sheets

(51) Int. Cl.
*G06F 21/31* (2013.01)
*H04L 51/02* (2022.01)

(58) Field of Classification Search
USPC .................................................... 709/206
See application file for complete search history.

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 10,439,979 B2 * | 10/2019 | Zucker ................ H04L 51/36 |
| 11,171,892 B2 * | 11/2021 | Licht .................. H04L 51/02 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2016/0219085 A1 * | 7/2016 | Jacobson ............. H04M 3/568 |
| 2017/0048170 A1 * | 2/2017 | Smullen .............. H04L 67/306 |
| 2017/0289069 A1 * | 10/2017 | Plumb ..................... G06F 9/46 |
| 2018/0026919 A1 * | 1/2018 | Gau .................... H04L 51/02 709/206 |
| 2019/0173811 A1 * | 6/2019 | Estrada ............. G06Q 30/016 |
| 2019/0207875 A1 * | 7/2019 | Youssefi .......... G06F 16/90332 |
| 2019/0349321 A1 * | 11/2019 | Cai ...................... G06F 40/237 |
| 2021/0136028 A1 * | 5/2021 | Clarke ................. H04L 51/14 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

Slack spoke, https://docs.servicenow.com/bundle/london-servicenow-platform/page/administer/integrationhub/reference/slack-spoke.html (last accessed May 11, 2020).

ServiceNow Chatbot on Slack, YouTube Video, https://www.youtube.com/watch?v=tdTwPr6UtFQ, May 21, 2018.

ServiceNow, Collaboration services for Task Communications Management, https://docs.servicenow.com/bundle/orlando-it-service-management/page/product/itsm-tcm/concept/collab-services-tcm.html, Jan. 23, 2020.

ServiceNow, Process flow for Slack communication, https://docs.servicenow.com/bundle/orlando-it-service-management/page/product/itsm-tcm/concept/process-flow-slack.html, Jan. 23, 2020.

(56) References Cited

OTHER PUBLICATIONS

ServiceNow, Set up Slack spoke / ServiceNow Docs, https://docs.servicenow.com/bundle/orlando-servicenow-platform/page/administer/integrationhub-store-spokes/task/set-up-slack.html, Jan. 23, 2020.

* cited by examiner

FIG. 7A

CHAT 700
- DRAFTS
- SAVED ITEMS
- PEOPLE
- APPS
- FILES

CHANNELS
DIGITALTRANSFORM
BOT_INTEGRATION
DT_TEST
CORE_TEAM
IT_ORG
GENERAL

DIRECT MESSAGES
- INCIDENTBOT
- PARTICIPANT1
- PARTICIPANT3

BOT_INTEGRATION 702

PARTICIPANT1 – 10:53AM ← 708
DOES ANYONE HAVE THE RECORDING?

PARTICIPANT2 – 11:29AM
HERE IS A LINK TO THE RECORDING IN CASE YOU MISSED IT: ← 710
HTTP://WWW.EXAMPLE.COM/ABC123

PARTICIPANT1 – 11:33AM ← 712

INCIDENTBOT – 6:46PM ← 714
WAS ADDED TO #BOT_INTEGRATION BY PARTICIPANT1

MESSAGE #BOT_INTEGRATION 706

704

CHAT 700

- DRAFTS
- SAVED ITEMS
- PEOPLE
- APPS
- FILES

CHANNELS
DIGITALTRANSFORM
BOT_INTEGRATION
DT_TEST
CORE_TEAM
IT_ORG
GENERAL

DIRECT MESSAGES
- INCIDENTBOT
- PARTICIPANT1
- PARTICIPANT3

BOT_INTEGRATION 702

PARTICIPANT1 – 10:53AM
DOES ANYONE HAVE THE RECORDING? ← 708

PARTICIPANT2 – 11:29AM
HERE IS A LINK TO THE RECORDING IN CASE YOU MISSED IT: ← 710
HTTP://WWW.EXAMPLE.COM/ABC123

PARTICIPANT1 – 11:33AM ← 712
✓

INCIDENTBOT – 6:46PM
WAS ADDED TO #BOT_INTEGRATION BY PARTICIPANT1 ← 714

/CREATENEWINCIDENT FOR @PARTICIPANT1    706

BOT_INTEGRATION

CHAT
- DRAFTS
- SAVED ITEMS
- PEOPLE
- APPS
- FILES

CHANNELS
DIGITALTRANSFORM
BOT_INTEGRATION
DT_TEST
CORE_TEAM
IT_ORG
GENERAL

DIRECT MESSAGES
- INCIDENTBOT
- PARTICIPANT1
- PARTICIPANT3

SUBMIT AN INCIDENT REPORT  720

WHAT IS THE NATURE OF YOUR INCIDENT?

[CHOOSE AN OPTION ⌄]  722

WHAT FEATURE DOES THIS RELATE TO?

[CHOOSE AN OPTION ⌄]  724

WHAT IS YOUR INCIDENT ABOUT?  726

PLEASE PROVIDE AS MUCH DETAIL AS YOU CAN

[                                     ]  728

[CANCEL]   [SUBMIT]

CREATENEWINCIDENT FOR @PARTICIPANT1

| CHAT 700 | #BOT_INTEGRATION 702 |
|---|---|
| • DRAFTS<br>• SAVED ITEMS<br>• PEOPLE<br>• APPS<br>• FILES<br><br>CHANNELS<br>#DIGITALTRANSFORM<br>#BOT_INTEGRATION<br>#DT_TEST<br>#CORE_TEAM<br>#IT_ORG<br>#GENERAL<br><br>DIRECT MESSAGES<br>• INCIDENTBOT<br>• PARTICIPANT1<br>• PARTICIPANT3 | PARTICIPANT2 – 11:29AM ← 710<br>HERE IS A LINK TO THE RECORDING IN CASE YOU MISSED IT:<br>HTTP://WWW.EXAMPLE.COM/ABC123<br><br>PARTICIPANT1 – 11:33AM ← 712<br>✓<br><br>INCIDENTBOT – 6:46PM ← 714<br>WAS ADDED TO #BOT_INTEGRATION BY PARTICIPANT1<br><br>INCIDENTBOT – 6:58PM<br>@PARTICIPANT1 YOUR INCIDENT HAS BEEN CREATED: INC007000201 ← 730<br>THANK YOU<br><br>[ MESSAGE #BOT_INTEGRATION ] 706<br>704 |

FIG. 7E

INCIDENT INC007000201 — 800

| Field | Value |
|---|---|
| NUMBER (802) | INC007000201 |
| STATE (814) | NEW |
| OPENED BY (804) | PARTICIPANT1 |
| ON HOLD REASON (816) | --NONE-- |
| CATEGORY (806) | DEFECT |
| SHORT DESCRIPTION (818) | I CANNOT AUTHENTICATE TO THE ACCESS POINT |
| FEATURE (808) | WIFI |
| LONG DESCRIPTION (820) | EVERY TIME I TRY TO LOG ON TO THE ACCESS POINT MY CREDENTIALS GET REJECTED. I AM USING THE SAME CREDENTIALS AS I DO FOR THE VPN – AM I DOING SOMETHING WRONG? |
| ASSIGNMENT GROUP (810) | ADMINS |
| ASSIGNED TO (812) | --NONE-- |

FIG. 8

INTEGRATION OF A MESSAGING PLATFORM WITH A REMOTE NETWORK MANAGEMENT APPLICATION

BACKGROUND

Messaging platforms have grown in scope over the last 25 years from being used mostly for personal connection and entertainment to critical components of communication infrastructure. Today, messaging platforms are used not only for person-to-person and/or group communication, but also for communication between one or more persons and a messaging "bot" that automatically responds to certain requests or provides predetermined types of updates. These bots may be software that offer one or more specific functions in the form of textual dialog and/or multimedia within the messaging platform.

SUMMARY

Enterprises have adopted messaging platforms in order to facilitate communication between pairs of employees and groups of employees, as well as between employees and customers. In some cases, enterprises can develop their own bots to address simple questions, concerns, and issues from employees and/or customers.

As more and more enterprises move their processes to cloud-based remote network management systems, it has become desirable to be able to use messaging platforms to communicate with such a system. Doing so can be a convenient alternative to a web-based interface or having to confer with another person. In some cases, this communication can be facilitated by a bot operating in the context of the messaging platform.

But such integrations have proven difficult in practice and are currently rudimentary at best. For instance, a user of a remote network management system might be able to configure an application thereon to transmit a message by way of a messaging platform when triggered by certain events occurring on the remote network management system. But this limited feature merely replaces email or text message notifications and does not provide much in the way of enhanced functionality.

The embodiments herein provide techniques for a deeper integration between a remote network management system and a messaging platforms. In particular, the embodiments provide for two-way communication between the remote network management system and the messaging platforms, by way of a bot. Doing so facilitates making changes to data on the remote network management system from the messaging platform, and enables viewing the results of these changes without having to log on to the remote network management system itself. Further, a subset of menu options from the remote network management system can be presented through the messaging platform, where these menu options are customized for the messaging platform's user interface.

Herein, the term "remote network management system" is occasionally used in place of the term "remote network management platform" in order to distinguish more clearly between two types of platform (a remote network management platform and a messaging platform). In general, the meaning of the term "platform" should be determined based on the context in which it appears.

Accordingly, a first example embodiment may involve persistent storage containing a predefined token and application state. The first example embodiment may also involve an application configured to communicate with a message bot executing on a messaging platform and perform operations including: (i) receiving, by way of an interface associated with a unit of program code and from the message bot, a command, wherein the command identifies a bot token and a user of a chat session in which the message bot is engaged; (ii) verifying, by the unit of program code, that the bot token matches the predefined token; (iii) verifying, by the unit of program code, that the user is authorized to use the command; (iv) writing, to the persistent storage, an update to the application state, wherein the update is based on the command; and (v) transmitting, by way the interface and to the message bot, a response confirming that the command has been performed.

A second example embodiment may involve receiving, by way of an interface of an application and from a message bot executing on a messaging platform, a command, wherein the command identifies a bot token and a user of a chat session in which the message bot is engaged, wherein the interface is associated with a unit of program code, and wherein persistent storage contains a predefined token and application state. The second example embodiment may also involve verifying, by the unit of program code, that the bot token matches the predefined token. The second example embodiment may also involve verifying, by the unit of program code, that the user is authorized to use the command. The second example embodiment may also involve writing, to the persistent storage, an update to the application state, wherein the update is based on the command. The second example embodiment may also involve transmitting, by way the interface and to the message bot, a response confirming that the command has been performed.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 7A, 7B, 7C, 7D, and 7E depicts graphical user interfaces of integration of a messaging platform with an application operating on a remote network management platform, in accordance with example embodiments.

FIG. 8 depicts a web page generated on behalf of an application operating on a remote network management platform that is integrated with a messaging platform, in accordance with example embodiments.

DETAILED DESCRIPTION

Figure 1:
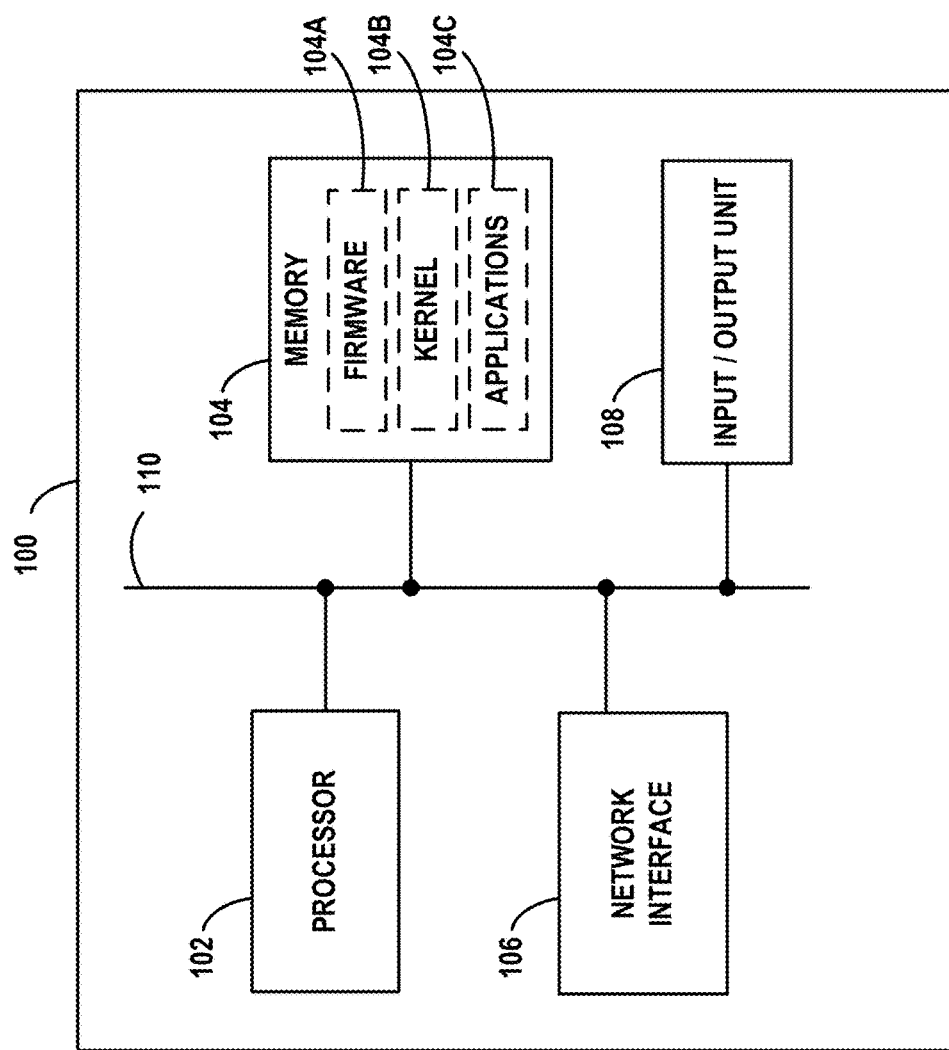
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies.

Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
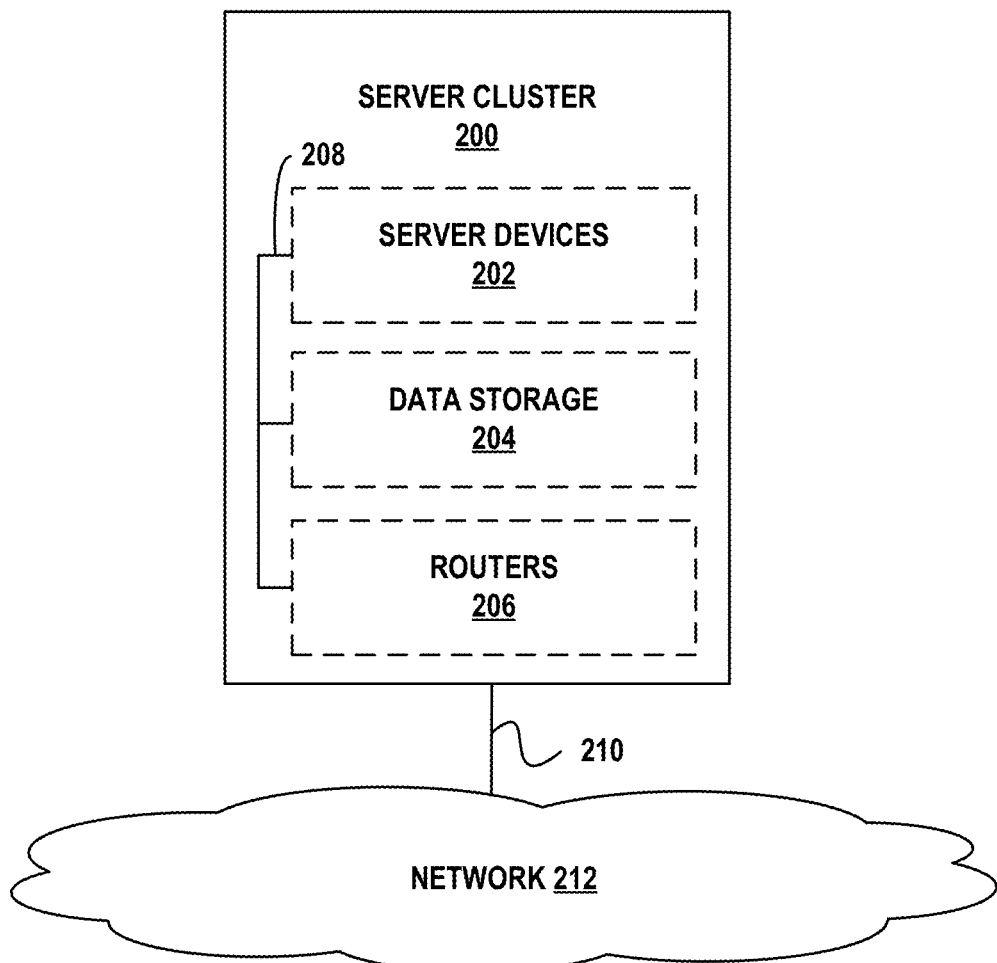
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
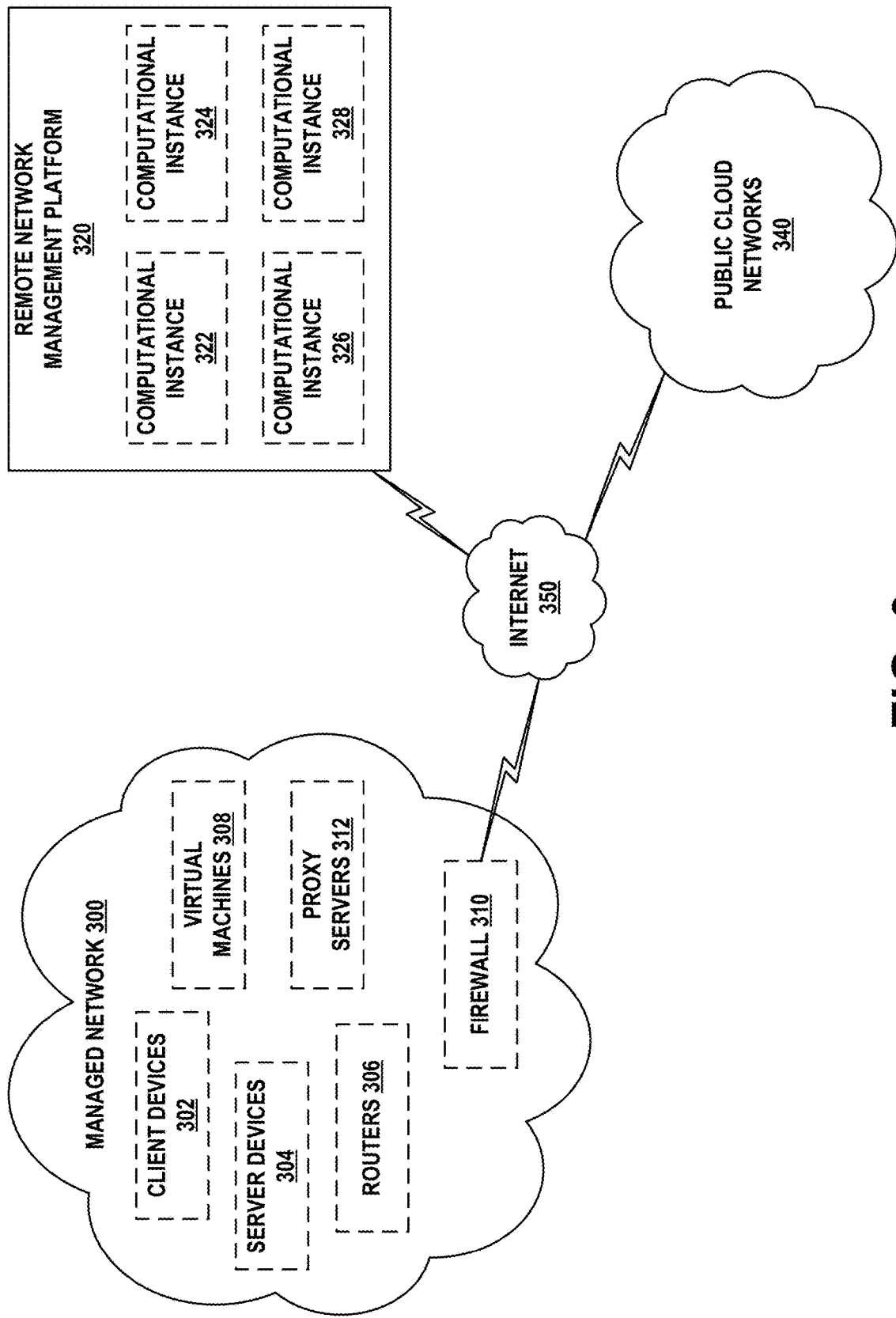
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion.

Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
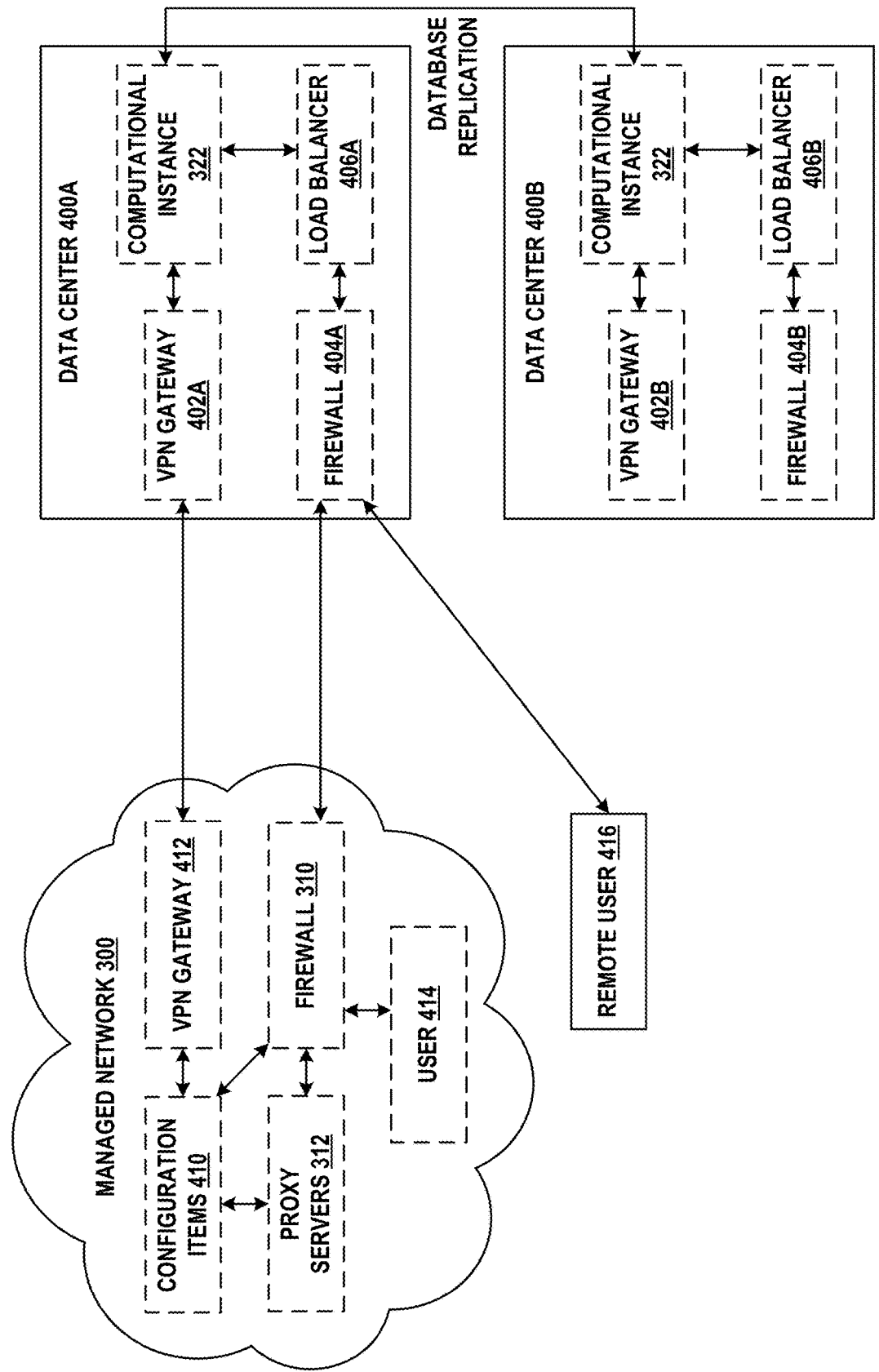
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
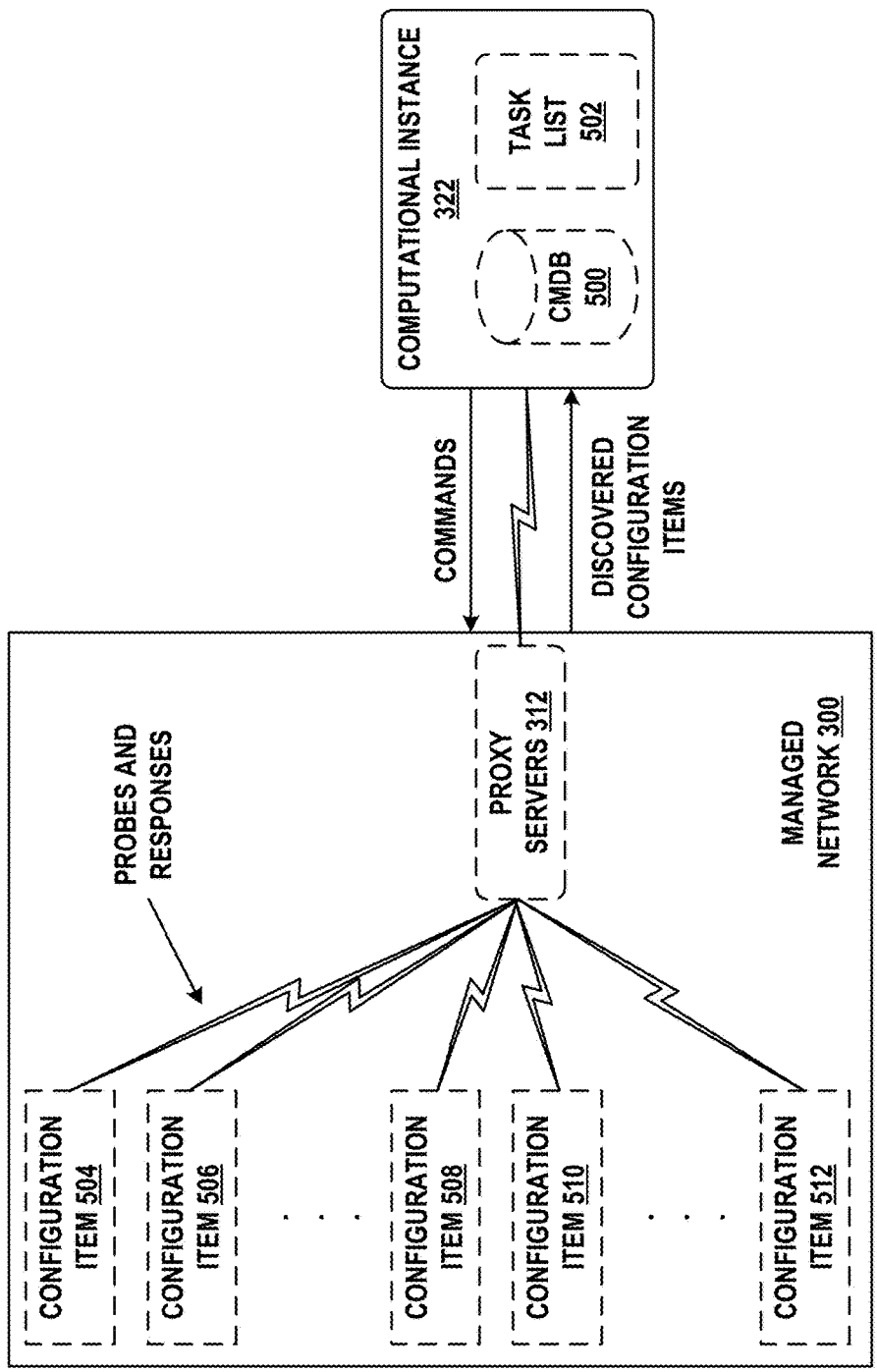
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
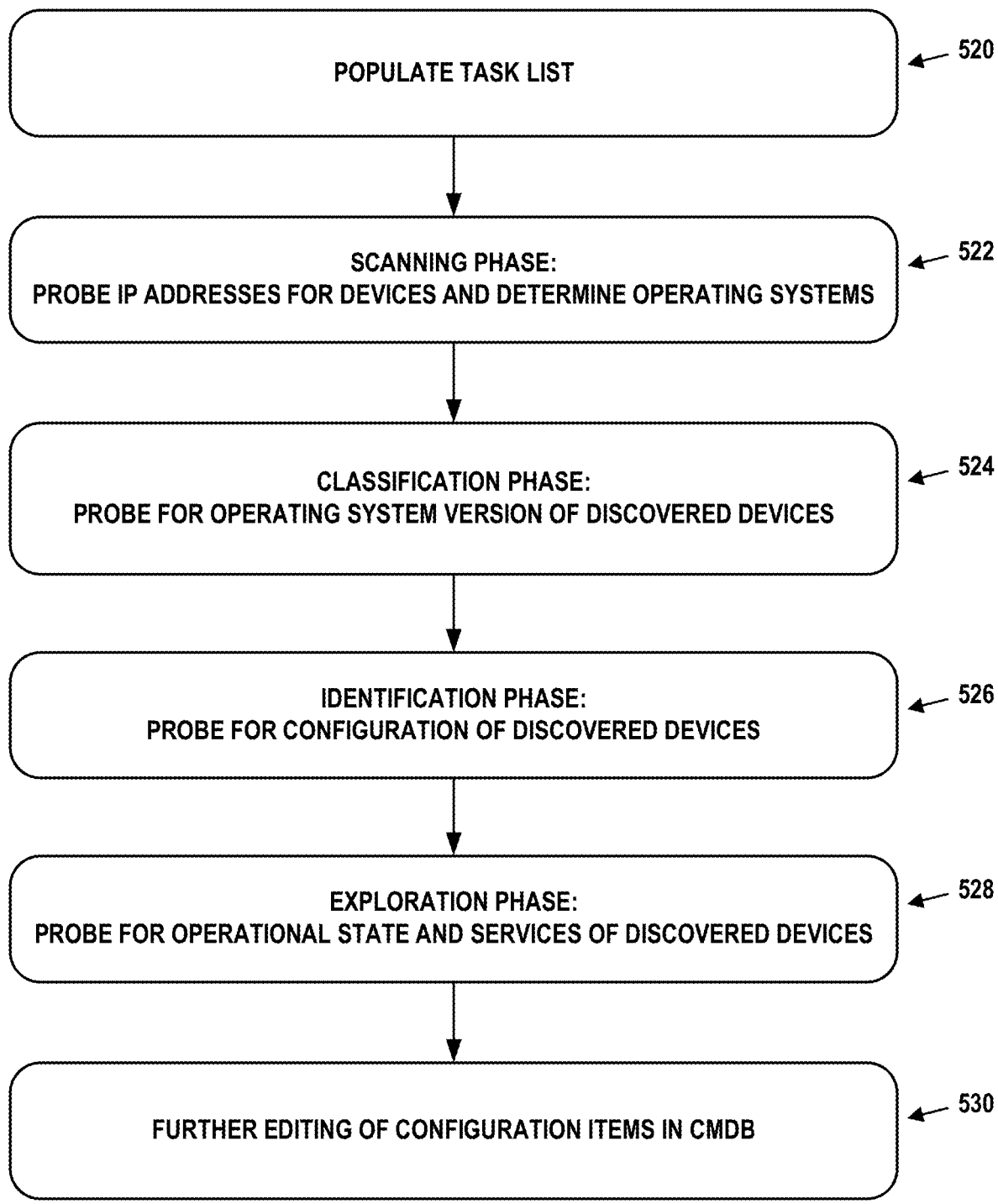
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Messaging Integration Architecture

As noted above, messaging platforms have gained popularity and there is benefit to integrating these applications with a computational instance of a remote network management platform. For example, IT services, IT operations, security operations, risk management, and human resources applications could be made easier to use through such an integration. In these integrations, a user may interact with such an application executing within a computational instance by way of a messages on the messaging platform.

Figure 6:
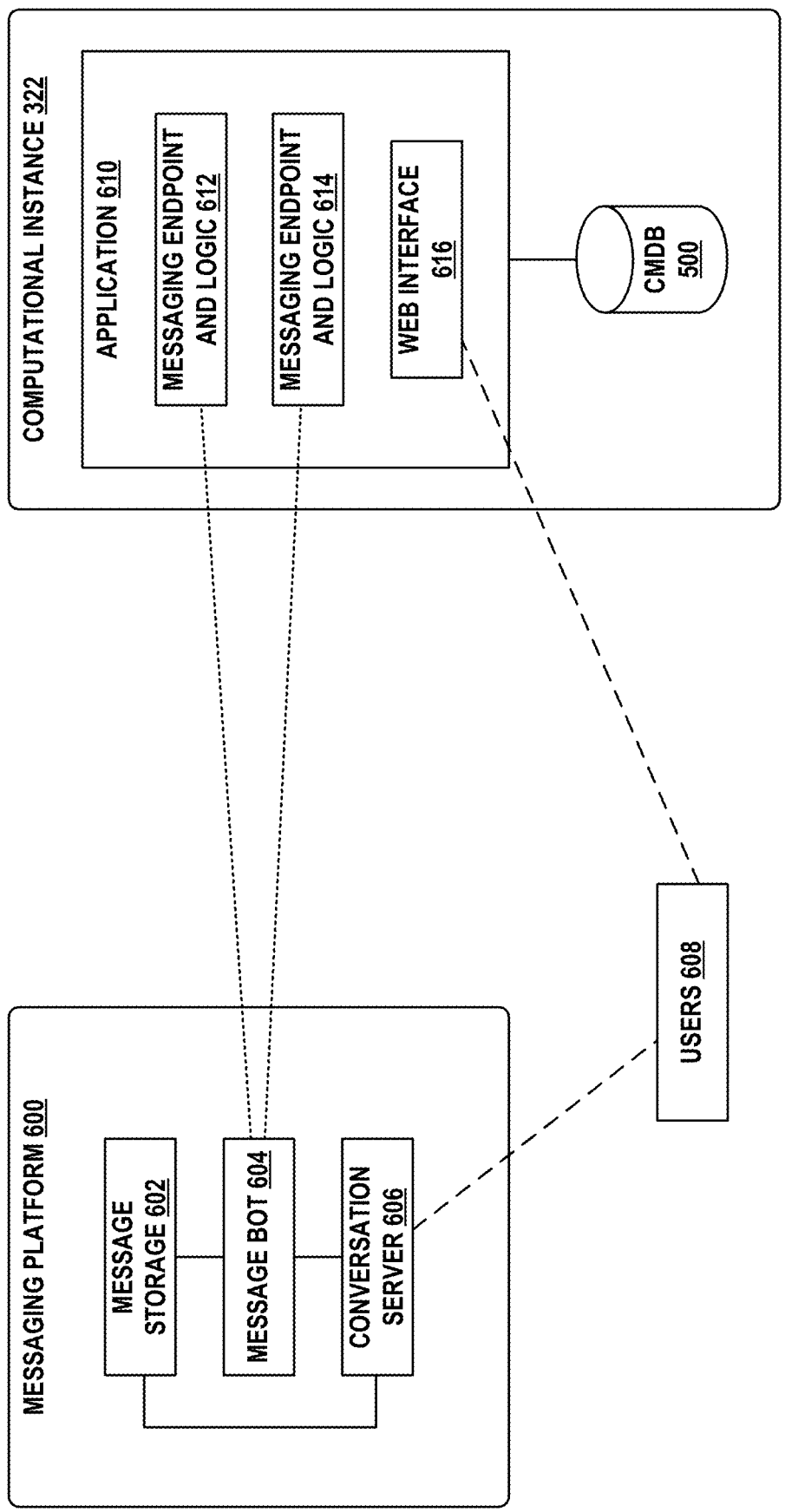
FIG. 6 depicts an example messaging integration architecture, in accordance with example embodiments.

FIG. 6 provides an example overview of an integration between messaging platform 600 and computational instance 322. As noted above, computational instance 322 may be one of multiple computational instances hosted by a remote network management platform.

Messaging platform 600 is software that facilitates communication between human users and bots (e.g., user-user communication, user-bot communication, and/or bot-bot communication). This communication may be primarily text-based but still images, videos, links, files, and other multimedia content may be shared. Each of users 608 may access messaging platform 600 by way of a dedicated client application (e.g., a desktop client or mobile client) or a web-based interface. Messaging platform 600 allows two or more of participants (users and/or bots) to communicate in chat sessions, in which text-based messages or other content can be shared. From these chat sessions, other communication modalities, such as audio conferences, video conferences, and screen sharing sessions can be launched. In some cases, a chat session can have separate channels (e.g., designated by different hashtags) and/or threaded conversations.

Herein, the term "chat session" refers to a virtual chat room in which one or more participants may communicate. Chat sessions may also be referred to as group chats or simply chats. A chat session begins when the virtual chat room is created and/or joined by participants and ends when deactivated or when all participants leave. Thus, a chat session may have a changing population of participants over time.

In a logical arrangement that is simplified for purposes of example, messaging platform 600 may include message storage 602, message bot 604, and conversation server 606. In practice, more components may make up messaging platform 600 and these components may be arranged in various ways.

Message storage 602 may be a database or other storage component, and may maintain copies of messages and other content shared in chat sessions. Not all information from every chat session may be retained. Nonetheless, message storage 602 allows participants to drop out of and back into a chat session without losing access to at least some content shared therein.

Message bot 604 may be software that is configured to automatically transmit content to individual participants and/or groups of participants in a chat session. Message bot 604 may also be configured to receive specifically formatted requests from participants and respond to these requests. In some embodiments, message bot 604 may be referred to as a chat bot and may rely upon some form of artificial intelligence or natural language processing to parse requests and formulate relevant responses. To the extent reasonable, messaging platform 600 may treat message bot 604 similarity to users 608 in terms of handling its communications.

Message server 606 may be another software module that provides a dispatch function for messages in chat sessions. For example, when a user in a chat session transmits a message into the virtual chat room, conversation server 606 may receive the message and broadcast it to all intended recipients in the corresponding chat session. In some cases, this may involve transmitting messages to and from human users and message bot 604. Conversation server 606 may also store received messages in message storage 602 and retrieve stored messages from message storage 602 as needed.

Users 608 may represent one or more human users with access to messaging platform 600. Users 608 may also have access, by way of web interface 616, to application 610 on computational instance 322.

As noted above, a computational instance 322 may be dedicated to a particular managed network and may participate in the discovery of computing resources disposed upon that managed network. Computational instance 322 may also support one or more applications, such as application 610. These applications may facilitate activities related to the managed network, such as IT services, IT operations, security operations, risk management, and/or human resources applications. As an example, application 610 may be an incident management application that allows technology users to open and manage incidents (trouble tickets) to be handled by an IT department.

In order to integrate application 610 with messaging platform 600, messaging endpoint and logic 612 and messaging endpoint and logic 614 may be provided. Each of messaging endpoint and logic 612 and messaging endpoint and logic 614 may be interfaces into application 610. For instance, they may be representational state transfer (REST) interfaces identified by unique URLs. Further, each may be associated with program code (e.g., functions, methods, or scripts) than executes when information is received by way of the respective interfaces. Such program code may be configured to change the state application 610, change the state of CMDB 500 or another database, and/or respond back to the sender of the information. The format of the information and the response may be JavaScript Object Notation (JSON), XML, some other text-based format, or a binary format.

As noted above, web interface 616 may provide users 608 (and possibly other individuals) access to application 610 by way of one or more web pages. Web interface 616 may be part of a larger web interface associated with computational instance 322.

Several possible information flows are facilitated by the architecture of FIG. 6. For example, one of users 608 may enter a command directed to message bot 604 into a chat session. Message bot 604 may receive this command, generate a corresponding request, and transmit this request to messaging endpoint and logic 612. Messaging endpoint and logic 612 may receive the request and provide information therein to associated program code. This program code may change the state of application 610 and/or a database used by application 610. The program code may also transmit, by way of messaging endpoint and logic 612, a response to message bot 604. Message bot 604 may receive this response and then transmit it or a variation thereof to the user by way of the chat session.

In another example, one of users 608 may subscribe to certain types of events from application 610 by way of message bot 604. For example, user 608 may enter a subscribe command directed to message bot 604 into a chat session. Message bot 604 may receive this subscribe command, generate a corresponding subscribe request, and transmit this subscribe request to messaging endpoint and logic 614. Messaging endpoint and logic 614 may receive the subscribe request and provide information therein to associated program code. This program code may create a trigger that causes certain changes in application 610 to be provided as events to the user. When one of these events occurs, the program code may transmit, by way of messaging endpoint and logic 614, a representation of the event. Message bot 604 may receive this representation and then transmit it or a variation thereof to the user by way of the chat session. Additional event notifications may continue to be provided to the user, by way of message bot 604, without the user having to send another request. In embodiments where application 610 is an incident management application, this may involve the user being notified of state changes of incidents that he or she opened. These state changes may include such an incident being put on hold or closed, for example. Alternatively, this notification process may occur without the user explicitly subscribing to the state changes of his or her incidents.

FIG. 6 is provided for purposes of example. More or fewer messaging platforms and/or message bots per messaging platform may be present. Further, there may be more than one application within computational instance 322 that is integrated with a messaging platform. Each such application may have one or more messaging endpoints and associated logic.

VI. Example Messaging Transaction

In order to illustrate the integration of messaging platform 600 with computational instance 322 by way of message bot 604 and application 610, FIGS. 7A-7E provide examples of user interaction with message bot 604. This interaction causes message bot 604 to change the state of application 610. In these examples, it is assumed that application 610 is an incident management application. But integration with other types of application may occur in a similar fashion.

FIG. 7A depicts a GUI including navigation pane 700, title pane 702, and chat session pane 704. This GUI illustrates what a user participating in chat sessions of messaging platform 600 might expect to see on their display.

Navigation pane 700 is labeled "chat" and includes three sections. The top section contains five selectable elements, labeled "drafts", "saved items", "people", "apps", and "files". When a user clicks on or otherwise activates any of these elements, messaging platform 600 may cause one or more of the other panes to display information relevant to the element selected or may cause a popup window to display such information. The middle section contains a list of chat session channels. The channel "#bot_integration" is highlighted to show that it is selected. When a user clicks on or otherwise activates any of the other channels, messaging platform 600 may cause one or more of the other panes to display information related to the selected chat session. The bottom section contains a list of participants in the selected channel or chat session to which the user can send a direct message. Direct messages are one-to-one sidebar conversations between participants that do not appear in a chat session.

Notably, the lists of participants includes incidentbot, a message bot application, as well as participant 1 and participant 3, two human participants. While participant2 is involved in the chat shown in chat session pane 704, participant2 may be unavailable for direct messaging. This may be due to a preference set by participant2.

For sake of this disclosure, incidentbot may be message bot 604 or at least have similar capabilities to that of message bot 604. Thus, incidentbot may be integrated with application 610 for purposes of opening, displaying, and/or otherwise managing incidents by way of a chat session.

Title pane 702 displays the channel of the selected chat session. Thus, in FIG. 7A, title pane 702 displays "#bot_integration".

Chat session pane 704 displays messages 708, 710, 712, and 714 from the chat session in the channel "#bot_integration". These messages may appear in a scrollable list in the chronological order in which they were received by messaging platform 600.

As an example, message 708 includes an icon or image representing the sender, the name of the sender ("participant1"), the time that the message was received ("10:53 AM"), and then the message ("Does anyone have the recording?") on a separate line of text. The icon or image could be a generic placeholder, such as the humanoid icon shown, or an image file such as a GIF, JPG, or PNG file. In addition to text, the message could include images, links (e.g., URLs), emojis, ideograms, or other content. For example, the URL in message 710 may be clickable or can otherwise be activated to display the content located at the URL.

Messages 708, 710, 712, and 714 may represent a conversation over time between the participants. Message 714 indicates that incidentbot was added to the chat session by participant1. Thus, this message is administrative and informational rather than part of the actual conversation. In general, messages may be displayed in chat session pane 704 whenever a participant (including a message bot) enters or leaves the chat session.

Text entry box 706 allows the user to type in or otherwise enter a message. When the user is done entering the message (e.g., the user presses the "return" or "enter" key), the user's messaging application (e.g., a desktop or mobile app) may transmit the message to messaging platform 600. This would cause the message to be displayed in chat session pane 704, as well as in similar panes for the other participants.

FIG. 7B depicts the same GUI as FIG. 7A, but with the user having typed a message into text entry box 706. This message uses the /createnewincident command to invoke incidentbot. In general, any token entered into text entry box 706 may be interpreted as a command rather than a message. In this case, incidentbot may have registered the command /createnewincident so that any use of the command will send a specific type of message to incidentbot. This implies that commands associated with all message bots within a given chat session would have to be unique (e.g., no two message bots can share the same command). Further, the full command, "/createnewincident for @participant1" is allowing the user to create the incident for another user, participant1. Thus, a /createnewincident command that includes the "for" option allows specification of another user (a different user from the one entering the command) as the opener of the incident. If the "for" option is omitted, message bot 604 may assume that the opener of the incident is the user providing the command. Note that the "at" sign @ is a way of tagging a participant in the chat session.

There may be other ways of creating a new incident from text entered into text entry box 706. For example, incident bot could be tagged in a command such as "@incidentbot create incident". This command may have the same or a similar effect as the "/createnewincident" command. Various interstitial windows or dialog boxes may be shown as part of this process.

In any event, entering such a command—regardless of exact form—causes message bot 604 to transmit a request to application 610. Application 610 responds to message bot 604 with information that causes messaging platform 600 to display a popup window in the user's GUI. This is depicted in FIG. 7C. Notably, a popup window is just one way of displaying this information, and other options may be possible. The content of the request and response are discussed below.

In FIG. 7C, popup window 720 prompts the user to submit an incident report and includes four input forms. Drop down menu 722 allows the user to specify the nature of the incident from a pre-determined list. This list may include options such as "I need information", "Something is not working", and "I have a suggestion". Other options may be possible.

Drop down menu 724 allows the user to specify the feature to which the incident relates from another pre-determined list. This additional list may include options such as "Internet", "Wifi", "Laptop", "Smartphone", and "Other". Further options may be possible.

Text entry boxes 726 and 728 allow the user to enter free-form text describing the problem. Text entry box 726 may be intended to contain a high-level description while text entry box 728 may be intended to contain a more detailed description.

Once the user is satisfied with the content of the four input forms, he or she may click on or otherwise activate the submit button to create the incident. If the user instead clicks on or selects the cancel button, popup window 720 may disappear and the incident might not be created.

Figure 7D:
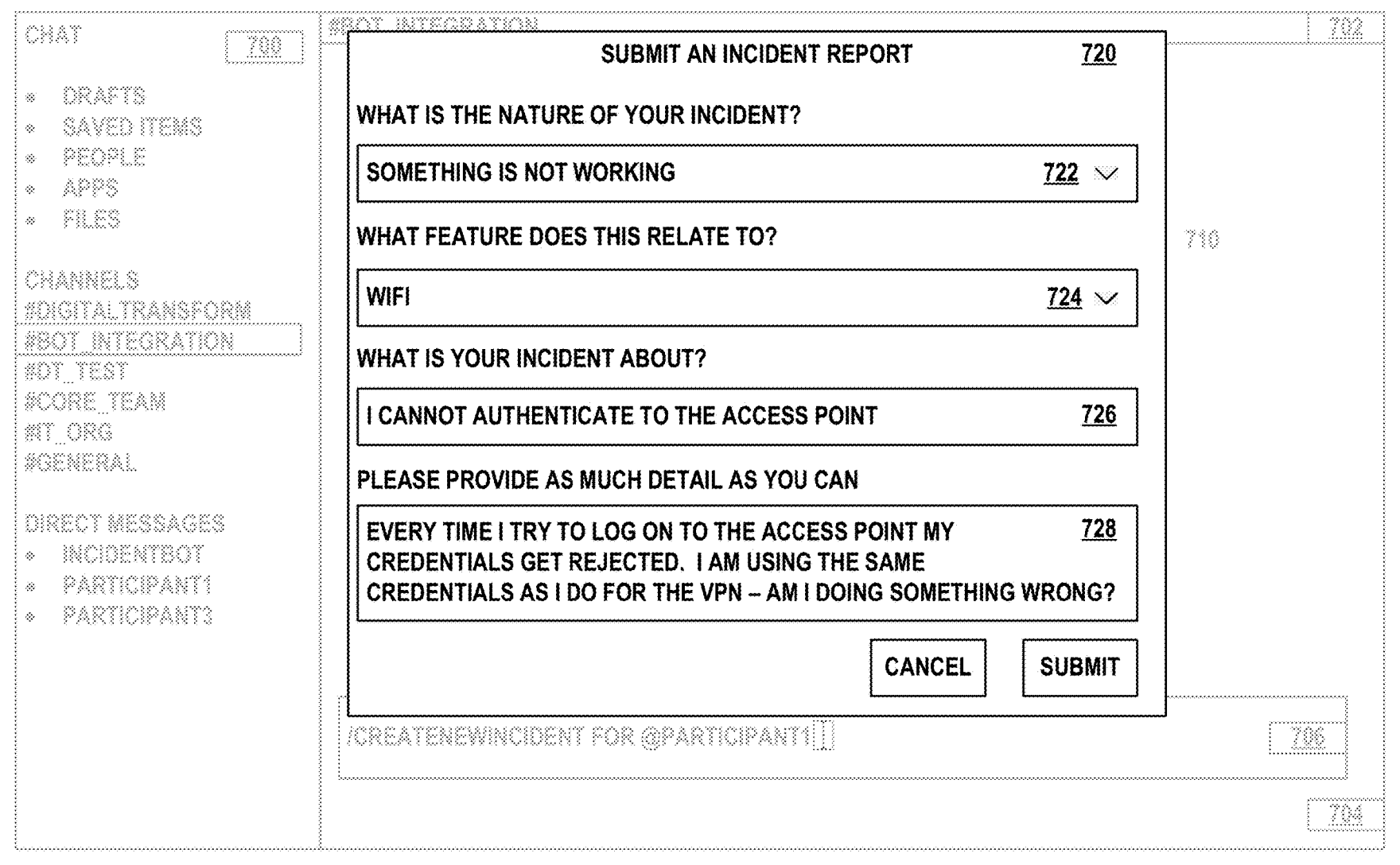

FIG. 7D depicts the same GUI as FIG. 7C, but with popup window 720 populated by the user. In particular, the user has selected the "Something is not working" option for drop down menu 722, and the "Wifi" option for drop down menu 724. Further, the user has indicated in text entry box 726 that they cannot authenticate to an access point, and has provided a more detailed version of this description in text entry box 728.

FIG. 7E shows the GUI after the user clicks on or otherwise activates the submit button of FIG. 7D. Notably, the messages previously displayed in chat session pane 704 have scrolled up and new message 730 is present. This message confirms that incidentbot has created an incident for participant1. Creating an incident may involve message bot 604 transmitting a representation of the information entered into popup window 720 to messaging endpoint and logic 612, for example, and the associated program code creating the incident in a database, such as CMDB 500.

In message 730, the incident number of INC007000201 is provided. This incident number may be formed as a link that, that, when clicked on or otherwise activated, accesses a web page by way of web interface 616. This web page may be provided by application 610 and may display information about the incident just created.

FIG. 8 depicts such a web page, web page 800. While web page 800 may be accessible by way of a link embedded into message 730, it can also be accessed by entering its URL into a web browser or by accessing application 610 by way of such a web browser. Notably, web page 800 may be served by web interface 616 using program logic of application 600 (not shown) and data from a database such as CMDB 500.

Web page 800 includes a number of fields read from the database. Field 802 specifies the incident number, INC007000201. Field 804 specifies who opened the incident. In this case, participant1 is specified because the user opened the incident on behalf of participant1.

Field 806 specifies that the category of incident is defect. The value of this field may be mapped from the input value selected for drop down menu 722. Field 808 specifies that the feature related to the incident is Wifi. The value of this field may be mapped from the input value selected for drop down menu 724.

Field 810 specifies the assignment group to which the incident is assigned (admins). Field 812 specifies the individual to whom the incident is assigned. In this case, no assignment to an individual has been made.

Field 814 specifies that the state of the incident is new. This value is used because the incident was recently opened, and it may change over the lifetime of the incident. Field 816 specifies the on hold reason for the incident. In this case, there is no such reason because the incident is not on hold.

Field 816 contains a short description of the incident, which was taken from what the user entered into text entry box 726. Field 818 contains a long description of the incident, which was taken from what the user entered into text entry box 728.

Web page 800 may be arranged in different ways and may contain more or less information about the incident. Further, the user may be able to edit one or more the fields of web page 800. Further, one or more additional commands may be supported by messaging bot 604 that allow at least a subset of the information in web page 800 for a given incident to be provided to a requesting user.

Figure 9:
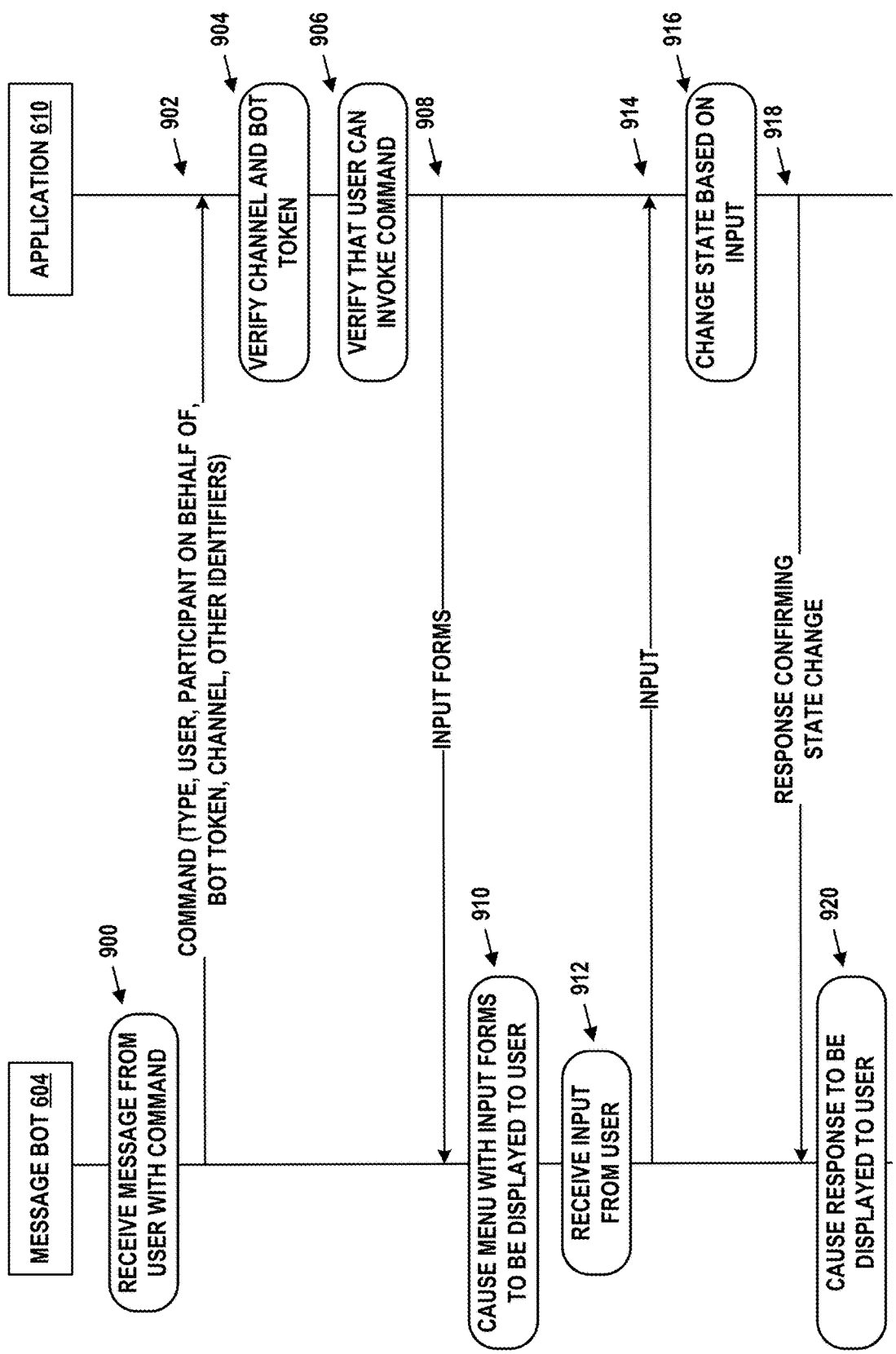
FIG. 9 is a message flow diagram, in accordance with example embodiments.

An overview of this type of transaction is depicted in FIG. 9. Message bot 604 is in communication with application 610. For sake of simplicity, other software infrastructure, such as messaging platform 600 and computational instance 322 are omitted.

At step 900, message bot 604 receives a message from a user by way of a chat session. The message may contain a command, such as the /createnewincident command discussed above.

At step 902, message bot 604 transmits a representation of the command to application 610. This representation may be in a structured text format, such as JSON or XML, or a binary format, for example. Further, the representation may be transmitted to a particular URL or address that is associated with a messaging endpoint and processing logic (e.g., messaging endpoint and processing logic 612). The representation may identify the type of command, the user who entered the command, the participant on behalf of whom the command was entered (if applicable), a bot token associated with message bot 604, a channel identifier of the chat session in which the command was entered, and possibly other identifying information as well.

The processing logic may consist of one or more units of program code that carry out a number of operations in response to receiving the representation. For example, at step 904, the processing logic may verify that the representation references a valid channel and includes a valid bot token. The bot token may be a shared key configured on both message bot 604 and application 610. If this verification fails, the transaction may end.

At step 906, the processing logic verify that the user can invoke the command. This may involve determining that one or more of the following conditions are true: (i) the user who entered the message was authorized to be able to do so (e.g., authorized to change the state of application 610), (ii) the user who entered the message was authorized to be able to do so on behalf of the participant (if applicable), and (iii) the participant is authorized to engage with application 610 in the manner requested. Other conditions may also be considered. If this verification fails, the transaction may end.

At step 908, the processing logic may generate a representation of input forms and transmit this representation to message bot 604. This representation may be in a structured text format, such as JSON or XML, or a binary format, for example. The representation may encode, for example, drop down menus, text entry boxes, and any accompanying text and/or graphics such as shown in popup window 720.

At step 910, in response to receiving the representation of the input forms, message bot 604 may cause the input forms to be displayed to the user on a GUI. This may involve message bot 604 translating the representation of the input forms into a representation of a GUI and transmitting this latter representation to the user by way of the chat session.

At step 912, message bot 604 may receive input from the user. This input may be from the user filling in one or more input forms from the GUI.

At step 914, message bot 604 may transmit a representation of the input to application 610. This representation may also be in a structured text format, such as JSON or XML, or a binary format, for example. Further, this representation may be transmitted to the particular URL or address that is associated with the previously-used messaging endpoint and processing logic or to a different URL or address that is associated with a different messaging endpoint and processing logic.

At step 916, application 610 (whether using the same or a different module of processing logic as before) changes its state based on the representation of the input. This may involve application 610 writing at least some of the input or a representation thereof to a database or another form of persistent storage.

At step 918, application 610 may transmit a response to the command confirming the state change. This response any include text, images, and/or other content.

At step 920, perhaps triggered by reception of the response, message bot 604 may cause a representation of the response to be displayed to the user on a GUI. This may involve message bot 604 translating the representation of the response into a representation of a GUI and transmitting this latter representation to the user by way of the chat session.

It should be apparent that the operations of FIG. 9 can be used to support the transaction exemplified in FIGS. 7A-7E. For example, the command of step 900 may be the command entered into text entry box 706 in FIG. 7B. The input forms of step 908 may be used to generate popup window 720. The input of step 912 may be information entered by the user in FIG. 7D. The response of step 918 may be used to generate message 730. But other possibilities exist.

In particular, the operations of FIG. 9 can be used to support integrating a message bot with various types of applications executable on a computational instance. These other applications may be related to risk management, IT operations, customer service, security operations, and so on.

These embodiments provide numerous advantages over previous techniques. Not only do they enable secure two-way communication between a message bot and a remote application, but do so in a scalable fashion. Individual commands and messages can be associated with dedicated units of processing logic (e.g., functions, methods, and/or subroutines) available by way of an interface of the remote application. In this manner, any number of message bots, commands, messages, and applications can be supported.

VII. Example Operations

Figure 10:
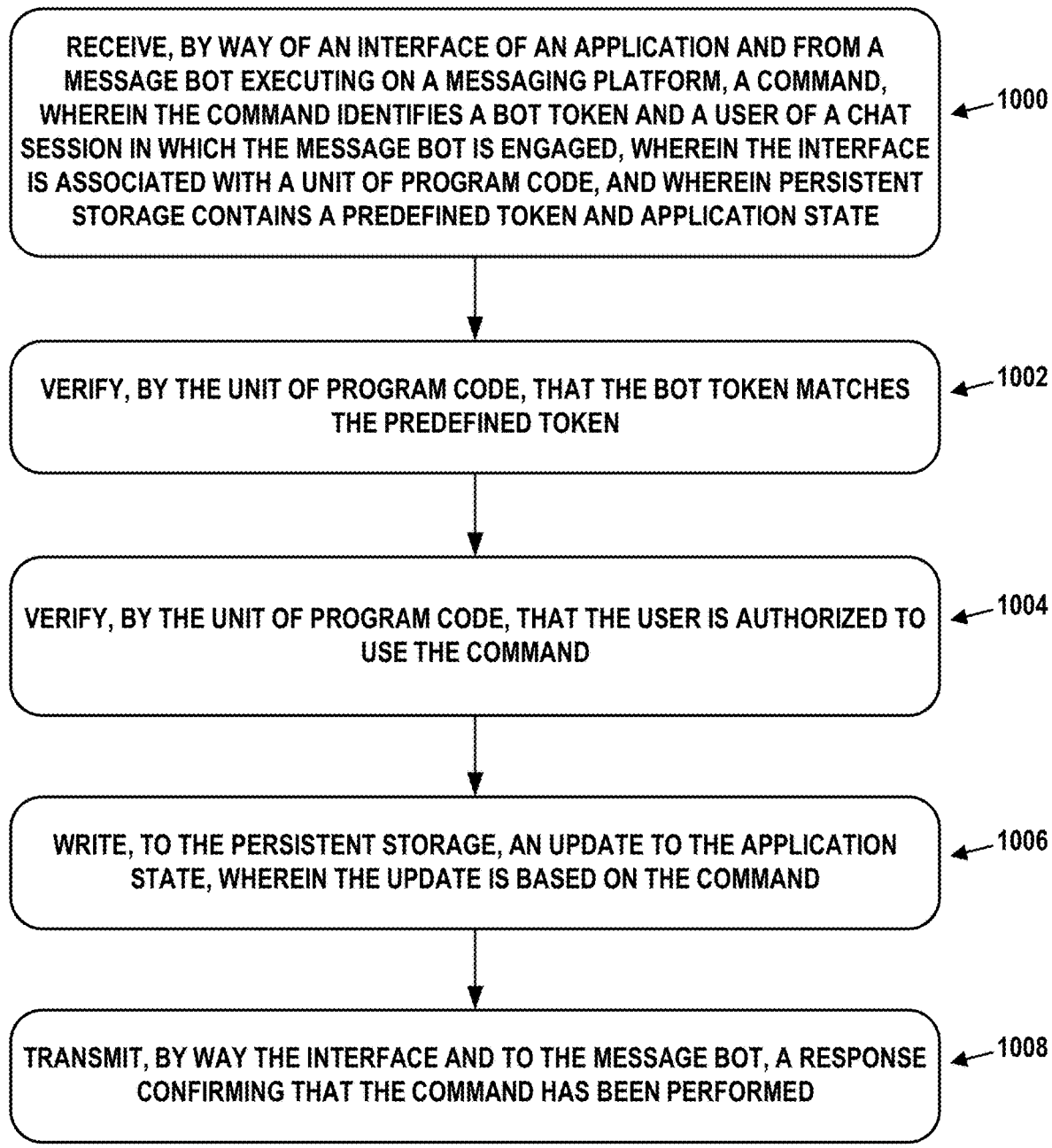
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving, by way of an interface of an application and from a message bot executing on a messaging platform, a command, wherein the command identifies a bot token and a user of a chat session in which the message bot is engaged, wherein the interface is associated with a unit of program code, and wherein persistent storage contains a predefined token and application state.

Block 1002 may involve verifying, by the unit of program code, that the bot token matches the predefined token.

Block 1004 may involve verifying, by the unit of program code, that the user is authorized to use the command.

Block 1006 may involve writing, to the persistent storage, an update to the application state, wherein the update is based on the command.

Block 1008 may involve transmitting, by way the interface and to the message bot, a response confirming that the command has been performed.

Some embodiments may involve: (i) transmitting, by way the interface and to the message bot, a representation of input forms; and (ii) receiving, by way of the interface and from the message bot, a representation of input corresponding to the input forms, wherein the update is also based on the input. In these embodiments, receiving the representation of the input forms causes the message bot to generate and transmit a representation of a graphical user interface element displaying the input forms to the user by way of the chat session.

In some embodiments, the command and the response are in a structured text format.

In some embodiments, the application also provides a web interface that is configured to display at least some of the application state in a form of a web page.

In some embodiments, the command also identifies a participant of the chat session on behalf of whom the command was provided, wherein verifying, by the unit of program code, that the user is authorized to use the command comprises: (i) verifying that the user is authorized to provide commands on behalf of the participant; and (ii) verifying that the participant is authorized to use the command.

In some embodiments, the application is an incident management application, the command is a request to create a new incident, and the update adds the new incident to a database in the persistent storage.

In some embodiments, the command is based on text entered by the user in the chat session, wherein the text identifies the message bot as recipient thereof.

In some embodiments, the interface is based on a URL associated with the application.

In some embodiments, the application is also configured to communicate with the message bot by way of a second interface, wherein the second interface is associated with a second unit of program code.

In some embodiments, the application is also configured to communicate with a second message bot by way of a second interface wherein the second interface is associated with a second unit of program code.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing a predefined token and application state; and
   one or more processors configured to perform, by way of an application that communicates with a message bot executing on a messaging platform, operations including:
   receiving, by way of an interface associated with a unit of program code and from the message bot, a command, wherein the command identifies a bot token and a user of a chat session in which the message bot is engaged, wherein the command is based on text that was entered by the user in the chat session, the command identifies a participant of the chat session on behalf of whom the command was provided, and the text identifies the message bot as recipient of the command;
   verifying, by the unit of program code, that the bot token matches the predefined token, wherein the predefined token comprises a shared key configured on both the message bot and the application;
   verifying, by the unit of program code, that the user is authorized to use the command;
   writing, to the persistent storage, an update to the application state, wherein the update is based on the command; and
   transmitting, by way the interface and to the message bot, a response confirming that the command has been performed, wherein the response causes the message bot to translate a representation of the response for display on a graphical user interface by way of the chat session.

2. The system of claim 1, wherein the operations further include:
   transmitting, by way the interface and to the message bot, a representation of input forms; and
   receiving, by way of the interface and from the message bot, a representation of input corresponding to the input forms, wherein the update is also based on the input.

3. The system of claim 2, wherein receiving the representation of the input forms causes the message bot to generate and transmit a representation of a graphical user interface element displaying the input forms to the user by way of the chat session.

4. The system of claim 1, wherein the command and the response are in a structured text format.

5. The system of claim 1, wherein the application also provides a web interface that is configured to display at least some of the application state in a form of a web page.

6. The system of claim 1, wherein verifying, by the unit of program code, that the user is authorized to use the command comprises:
   verifying that the user is authorized to provide commands on behalf of the participant; and
   verifying that the participant is authorized to use the command.

7. The system of claim 1, wherein the application is an incident management application, the command is a request to create a new incident, and the update adds the new incident to a database in the persistent storage.

8. The system of claim 1, wherein the interface is based on a uniform resource locator (URL) associated with the application.

9. The system of claim 1, wherein the application is also configured to communicate with the message bot by way of a second interface, wherein the second interface is associated with a second unit of program code.

10. The system of claim 1, wherein the application is also configured to communicate with a second message bot by way of a second interface wherein the second interface is associated with a second unit of program code.

11. A computer-implemented method comprising:
    receiving, by way of an interface of an application and from a message bot executing on a messaging platform, a command, wherein the command identifies a bot token and a user of a chat session in which the message bot is engaged, wherein the command is based on text that was entered by the user in the chat session, the command identifies a participant of the chat session on behalf of whom the command was provided, and the text identifies the message bot as recipient of the command, wherein the interface is associated with a unit of program code, and wherein persistent storage contains a predefined token and application state;
    verifying, by the unit of program code, that the bot token matches the predefined token, wherein the predefined token comprises a shared key configured on both the message bot and the application;
    verifying, by the unit of program code, that the user is authorized to use the command;
    writing, to the persistent storage, an update to the application state, wherein the update is based on the command; and
    transmitting, by way the interface and to the message bot, a response confirming that the command has been performed, wherein the response causes the message bot to translate a representation of the response for display on a graphical user interface by way of the chat session.

12. The computer-implemented method of claim 11, further comprising:
    transmitting, by way the interface and to the message bot, a representation of input forms; and
    receiving, by way of the interface and from the message bot, a representation of input corresponding to the input forms, wherein the update is also based on the input.

13. The computer-implemented method of claim 12, wherein receiving the representation of the input forms causes the message bot to generate and transmit a representation of a graphical user interface element displaying the input forms to the user by way of the chat session.

14. The computer-implemented method of claim 11, wherein the command and the response are in a structured text format.

15. The computer-implemented method of claim 11, wherein the application also provides a web interface that is configured to display at least some of the application state in a form of a web page.

16. The computer-implemented method of claim 11, wherein verifying, by the unit of program code, that the user is authorized to use the command comprises:
    verifying that the user is authorized to provide commands on behalf of the participant; and verifying that the participant is authorized to use the command.

17. The computer-implemented method of claim 11, wherein the application is an incident management application, the command is a request to create a new incident, and the update adds the new incident to a database in the persistent storage.

18. An article of manufacture including a non-transitory computer-readable medium, having stored thereon program instructions that, upon execution by a computing system, cause the computing system to perform operations comprising:

receiving, by way of an interface of an application and from a message bot executing on a messaging platform, a command, wherein the command identifies a bot token and a user of a chat session in which the message bot is engaged, wherein the command is based on text that was entered by the user in the chat session, the command identifies a participant of the chat session on behalf of whom the command was provided, and the text identifies the message bot as recipient of the command, wherein the interface is associated with a unit of program code, and wherein persistent storage contains a predefined token and application state;

verifying, by the unit of program code, that the bot token matches the predefined token, wherein the predefined token comprises a shared key configured on both the message bot and the application;

verifying, by the unit of program code, that the user is authorized to use the command;

writing, to the persistent storage, an update to the application state, wherein the update is based on the command; and transmitting, by way the interface and to the message bot, a response confirming that the command has been performed, wherein the response causes the message bot to translate a representation of the response for display on a graphical user interface by way of the chat session.

19. The article of manufacture of claim 18, wherein the operations further include:

transmitting, by way the interface and to the message bot, a representation of input forms; and receiving, by way of the interface and from the message bot, a representation of input corresponding to the input forms, wherein the update is also based on the input.

20. The article of manufacture of claim 19, wherein receiving the representation of the input forms causes the message bot to generate and transmit a representation of a graphical user interface element displaying the input forms to the user by way of the chat session.

* * * * *